(12) United States Patent
Biber et al.

(10) Patent No.: US 9,258,942 B2
(45) Date of Patent: Feb. 16, 2016

(54) METHOD FOR PROCESSING A SURFACE BY MEANS OF A ROBOTIC VEHICLE

(75) Inventors: Peter Biber, Poltringen (DE); Amos Albert, Leonberg (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 13/997,820

(22) PCT Filed: Dec. 23, 2011

(86) PCT No.: PCT/EP2011/073993
§ 371 (c)(1),
(2), (4) Date: Sep. 13, 2013

(87) PCT Pub. No.: WO2012/089679
PCT Pub. Date: Jul. 5, 2012

(65) Prior Publication Data
US 2013/0345922 A1    Dec. 26, 2013

(30) Foreign Application Priority Data

Dec. 29, 2010 (DE) .......................... 10 2010 064 329
Jan. 24, 2011 (DE) .......................... 10 2011 003 064

(51) Int. Cl.
*A01D 34/00* (2006.01)
*G05D 1/02* (2006.01)

(52) U.S. Cl.
CPC ............ *A01D 34/008* (2013.01); *G05D 1/0219* (2013.01); *G05D 1/0274* (2013.01); *G05D 2201/0208* (2013.01)

(58) Field of Classification Search
CPC . G05D 1/0219; G05D 1/0238; G05D 1/0274; G05D 1/0278; G05D 2201/0208; A01D 34/008

USPC .......................................................... 700/245
See application file for complete search history.

(56) References Cited

U.S. PATENT DOCUMENTS 4,294,544 A * 10/1981 Altschuler et al. ............ 356/610
5,315,537 A * 5/1994 Blacker .......................... 716/51
(Continued)

FOREIGN PATENT DOCUMENTS

CN         201402412 Y     2/2010
DE     10 2007 023 157 A1  11/2008
(Continued)

OTHER PUBLICATIONS

Manuele Bicego, and Vittorio Murino, "Investigating Hidden Markov Models' Capabilities in 2D Shape Classification", IEEE Transactions on Pattern Analysis and Machine Intelligence, vol. 26, No. 2, Feb. 2004.*

(Continued)

*Primary Examiner* — Truc M Do
(74) *Attorney, Agent, or Firm* — Maginot, Moore & Beck LLP

(57) ABSTRACT

The disclosure relates to a method for processing a surface by means of a robotic vehicle, wherein the robotic vehicle has a control system in which data concerning the outline of the surface to be processed are stored, wherein locating means are present, which determine the position of the robotic vehicle, in particular in relation to the surface to be processed, and wherein the method comprises the following steps: dividing the surface to be processed into individual segments; classifying each individual segment into a property class; and moving to and processing each individual segment in succession, each individual segment being processed with a processing strategy corresponding to its property class.

11 Claims, 3 Drawing Sheets

(56) References Cited

U.S. PATENT DOCUMENTS

| | | | |
|---|---|---|---|
| 5,345,490 A * | 9/1994 | Finnigan et al. | 378/4 |
| 5,696,675 A | 12/1997 | Nakamura et al. | |
| 5,974,347 A * | 10/1999 | Nelson | 701/22 |
| 6,085,130 A * | 7/2000 | Brandt et al. | 701/26 |
| 6,246,784 B1 * | 6/2001 | Summers et al. | 382/128 |
| 7,194,117 B2 * | 3/2007 | Kaufman et al. | 382/128 |
| 7,272,474 B1 * | 9/2007 | Stentz et al. | 701/26 |
| 7,324,103 B2 * | 1/2008 | Stewart et al. | 345/420 |
| 8,224,516 B2 * | 7/2012 | Anderson | 701/23 |
| 2001/0022506 A1 * | 9/2001 | Peless et al. | 318/580 |
| 2001/0039487 A1 * | 11/2001 | Hammersley et al. | 703/2 |
| 2002/0156556 A1 * | 10/2002 | Ruffner | 701/23 |
| 2003/0018423 A1 * | 1/2003 | Saller et al. | 701/50 |
| 2003/0025472 A1 * | 2/2003 | Jones et al. | 318/568.12 |
| 2003/0149500 A1 * | 8/2003 | Faruque et al. | 700/97 |
| 2004/0068352 A1 * | 4/2004 | Anderson | 701/25 |
| 2004/0111184 A1 * | 6/2004 | Chiappetta et al. | 700/245 |
| 2004/0193348 A1 * | 9/2004 | Gray et al. | 701/50 |
| 2004/0207355 A1 * | 10/2004 | Jones et al. | 318/568.12 |
| 2004/0213915 A1 * | 10/2004 | Andersen | 427/421.1 |
| 2005/0000543 A1 * | 1/2005 | Taylor et al. | 134/18 |
| 2005/0038578 A1 * | 2/2005 | McMurtry et al. | 701/25 |
| 2005/0046373 A1 * | 3/2005 | Aldred | 318/580 |
| 2005/0131581 A1 * | 6/2005 | Sabe et al. | 700/245 |
| 2005/0197766 A1 * | 9/2005 | Flann et al. | 701/202 |
| 2005/0285855 A1 * | 12/2005 | Chien et al. | 345/419 |
| 2006/0090438 A1 * | 5/2006 | Hunt et al. | 56/10.2 A |
| 2007/0078591 A1 * | 4/2007 | Meunier et al. | 701/120 |
| 2007/0198159 A1 * | 8/2007 | Durkos et al. | 701/50 |
| 2007/0265743 A1 * | 11/2007 | Kojitani et al. | 701/29 |
| 2008/0095968 A1 * | 4/2008 | Semon | 428/66.1 |
| 2008/0167753 A1 * | 7/2008 | Peless et al. | 700/253 |
| 2008/0183349 A1 * | 7/2008 | Abramson et al. | 701/23 |
| 2008/0208461 A1 * | 8/2008 | Gharsalli et al. | 701/209 |
| 2008/0249661 A1 * | 10/2008 | Hong et al. | 700/252 |
| 2008/0276408 A1 * | 11/2008 | Gilbert et al. | 15/320 |
| 2009/0043504 A1 * | 2/2009 | Bandyopadhyay et al. | 701/213 |
| 2009/0228166 A1 * | 9/2009 | Durkos et al. | 701/26 |
| 2009/0251366 A1 * | 10/2009 | McClure et al. | 342/357.09 |
| 2009/0281661 A1 | 11/2009 | Dooley et al. | |
| 2011/0125324 A1 * | 5/2011 | Baek et al. | 700/258 |
| 2011/0167574 A1 * | 7/2011 | Stout et al. | 15/3 |
| 2011/0202175 A1 * | 8/2011 | Romanov et al. | 700/250 |
| 2011/0202224 A1 * | 8/2011 | Thompson et al. | 701/26 |
| 2011/0295423 A1 * | 12/2011 | Anderson | 700/248 |
| 2011/0295424 A1 * | 12/2011 | Johnson et al. | 700/248 |
| 2012/0011669 A1 * | 1/2012 | Schnittman et al. | 15/52.1 |
| 2013/0166134 A1 * | 6/2013 | Shitamoto et al. | 701/26 |
| 2013/0238183 A1 * | 9/2013 | Goulding | 701/26 |

FOREIGN PATENT DOCUMENTS

| | | |
|---|---|---|
| EP | 1 557 730 A1 | 7/2005 |
| EP | 1 898 289 A2 | 3/2008 |
| EP | 2 269 433 A1 | 1/2011 |

OTHER PUBLICATIONS

International Search Report corresponding to PCT Application No. PCT/EP2011/073993, mailed Apr. 5, 2012 (German and English language document) (7 pages).

Acar E U et al.; "Morse Decompositions for Coverage Tasks", The International Journal of Robotics Research, vol. 21, No. 4, Apr. 2002, pp. 331-344, XP002672247, Sage Publications.

\* cited by examiner

METHOD FOR PROCESSING A SURFACE BY MEANS OF A ROBOTIC VEHICLE

This application is a 35 U.S.C. §371 National Stage Application of PCT/EP2011/073993, filed on Dec. 23, 2011, which claims the benefit of priority to Serial No. DE 10 2010 064 329.7 filed on Dec. 29, 2010 in Germany and to Serial No. DE 10 2011 003 064.6 filed on Jan. 24, 2011 in Germany, the disclosures of which are incorporated herein by reference in their entirety.

BACKGROUND

The disclosure relates to a method for processing a surface area by means of a robotic vehicle. A multiplicity of methods for processing a surface area by means of a robotic vehicle are known from the prior art, wherein the surface area is embodied as a lawn surface and is processed and/or mown by means of an autonomously controlled lawn mower. These methods are encumbered by the problem in particular of recognizing outer boundaries of the (lawn) surface area that is to be processed. It is therefore already known from the prior art to use, for example, retaining wires that encompass the outer boundary of the surface area that is to be processed, wherein the retaining wire can be recognized by the robotic vehicle using sensing technology. Moreover, a method is known from DE 10 2007 023 157 A1 of the applicant, in which method the outer boundary can be detected by means of sensors, wherein the sensors comprise at least one infra-red sensor that detects the intensity of an infra-red beam that is reflected from the ground. With the knowledge of the outer boundary of the surface area that is to be processed, it is further known that a control unit can produce an outline map of the surface area that is to be processed.

With respect to a strategy for processing a surface area that is to be processed, it is known to process a surface area according to the random principle. This means that the robotic vehicle moves within the surface area that is to be processed in a straight line at a random angle with respect to the surrounding area, until it comes into contact with a surrounding boundary. A new random angle is generated once the robotic vehicle has performed a turning maneuver at this site. Using courses of this type that are selected randomly has the disadvantage that it takes quite a long time to process a surface area until the surface area to be processed has actually been completely processed. In particular, surface areas are also processed or driven over a number of times. Ideally, a surface area that is to be processed is processed by means of area segments that are arranged in parallel with each other, wherein the area segments end in each case at the outer boundary of the surface area and are connected by 180° curves. A processing strategy of this type renders it possible in the shortest possible time to completely process the surface area, which strategy, moreover, also offers aesthetic advantages, for example in the case of mowing a lawn surface.

Moreover, devices and/or methods for determining the position of a robotic vehicle in an extremely accurate manner are known from the prior art. Position-determining systems of this type are used in order to be able to navigate the robotic vehicle with a high degree of accuracy within the surface area that is to be processed. However, position-determining systems of this type are encumbered with the problem that as the degree of accuracy of the position-determining system increases, so does the necessary expenditure on said position-determining system. This means a relatively high cost expenditure particularly in the private sector, for example for mowing lawn surfaces.

SUMMARY

Based on the prior art illustrated, the object of the disclosure is to further develop a method for processing a surface area by means of a robotic vehicle, in such a manner that said method renders it possible to process a surface area in a rapid and effective manner by means of relatively cost-effective position-determining systems for the robotic vehicle. The term 'a relatively cost-effective position-determining system' is understood to mean a system wherein the robotic vehicle can determine its position with a degree of accuracy between 10 cm and 2 m in relation to an existing outline map. This object is achieved in the case of a method for processing a surface area by means of a robotic vehicle having the features described herein. The method in accordance with the disclosure proposes a processing strategy wherein, with the knowledge of the surface area that is to be processed, the surface area that is to be processed is initially divided into individual segments, said individual segments are subsequently classified with respect to a characteristics classification and finally the individual segments are driven over and processed one after the other, wherein depending upon the characteristics classification of the corresponding individual segment said individual segment is processed with a specific processing strategy.

Advantageous further developments of the method in accordance with the disclosure for processing a surface area by means of a robotic vehicle are described herein. All combinations of at least two of the features that are disclosed in the claims, the description and/or the figures are covered by the scope of the disclosure.

In order to detect the outer boundary of the surface area that is to be processed, it is proposed in accordance with the disclosure in a first embodiment that the data with respect to the surface area that is to be processed is obtained by the robotic vehicle driving along an outer boundary. All methods known from the prior art can be applied and/or used for recognizing outer boundaries of a surface area that is to be processed.

It is preferred that, when controlling the robotic vehicle with the knowledge of the surface area that is to be processed, said surface area that is to be processed is divided into individual segments, wherein the individual segments comprise basic geometric shapes that embody in each case an individual segment.

It is particularly preferred that the individual segments are divided up in such a manner that the basic shape comprises preferred geometric characteristics, in particular, that the basic shape is rectangular and consequently convex. Consequently, the knowledge is advantageously used that the basic shapes that are embodied in a rectangular and convex manner can be processed in a particularly simple and effective manner.

With the knowledge of the individual segments and their geometric characteristics, it is proposed in a preferred embodiment that the characteristics classification is established on the basis of achieving the preferred geometric characteristics.

Prior to actually processing the surface by means of the robotic vehicle, it is preferably proposed that the number, size and the outline of the individual segments are initially controlled by means of the surface area that is to be processed being divided randomly into a multiplicity of temporary individual segments, and that the final individual segments are generated from the temporary individual segments, wherein the total or surface area of the preferred characteristics classification is as large as possible. In other words, this means that the control unit of the robotic vehicle attempts to use a strategy wherein the surface area that is to be processed can be processed as rapidly and effectively as possible.

It can also be provided that results from previous processing operations can be used when dividing the surface area into individual segments. This can occur, for example by virtue of the fact that with the knowledge of the surface area that is to be processed a comparison is made with surface areas that have been processed and are stored in a memory device in the control unit. If it is established that the surface area that is to be currently processed corresponds to a surface area that has been processed previously, then it is concluded therefrom that the two surface areas are identical. Moreover, if it should be established during a previous processing operation that, for example, an obstacle, for example a tree, is standing within the surface area that is to be processed, then this information can be used for the current division of the surface area into individual segments, in that, for example the region in which the obstacle is standing is processed by means of a random strategy. Moreover, the results that occur for the first time during the current processing operation can be used in order to use the described method of functions again in order in this manner to generate in real time an optimum residual processing strategy for the remaining surface area that has not yet been processed.

The strategies for processing the individual segments reside in particular in driving over said surface area in a pre-defined movement path or in a random movement path. The pre-defined movement path comprises preferably path portions that are arranged in parallel with each other, and the random movement path through straight-line path portions that are connected by means of turning maneuvers that are generated at the boundaries of the individual segment and comprise a random angle.

The method is preferably used in the case of an autonomously operating lawn mower. An autonomously operating lawn mower of this type renders it possible in the case of relatively cost-effective navigation means to process a lawn surface in an effective manner.

BRIEF DESCRIPTION OF THE DRAWINGS

Further advantages, features and details of the disclosure are evident in the description below of preferred exemplary embodiments and with reference to the drawing, in which.

DETAILED DESCRIPTION

Figure 1:
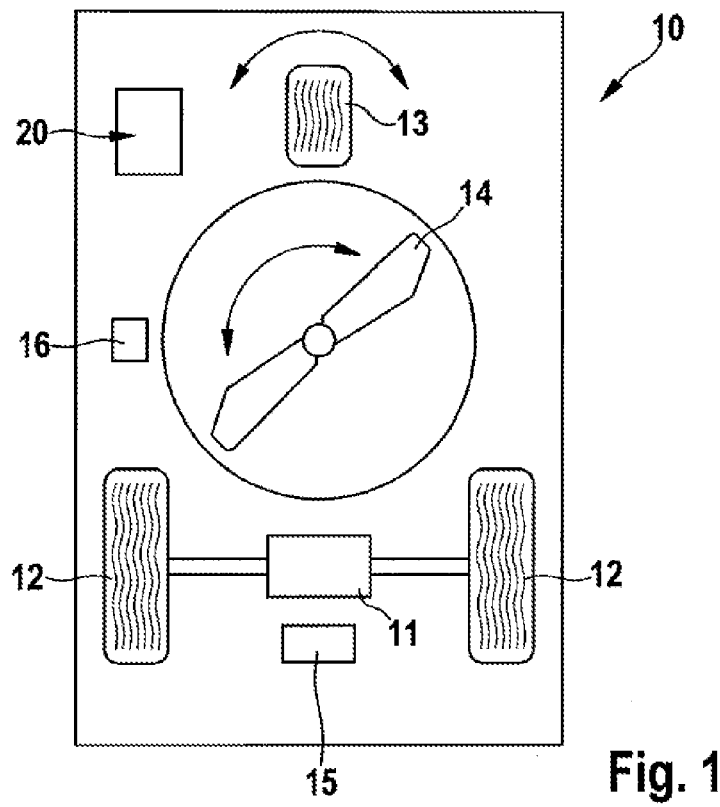
FIG. 1 shows a simplified plan view of an autonomously operating lawn mower.

FIG. 1 illustrates a simplified plan view of a robotic vehicle in the form of an autonomously operating lawn mower 10.

The lawn mower 10 comprises two rear wheels 12 that are driven by way of a drive motor 11 and a steerable front wheel 13.

As a deviation from the illustrated exemplary embodiment, it is also feasible that the lawn mower 10 comprises two drive wheels that are driven independently of each other, so that the travel direction of the lawn mower 10 is influenced by way of different drive rotational speeds.

Furthermore, a mowing tool 14 is evident with which a lawn surface can be mowed. The lawn mower 10 comprises furthermore a control unit 15 and at least one sensor element 16 that is used to detect an outer boundary 101 of a surface area 100 that is to be processed. The sensor element 16 can be embodied differently for recognizing the outer boundary 101 depending upon a specific layout. Thus, it is, for example, feasible that the sensor element 16 recognizes the outer boundary 101 of the surface area 100 that is to be processed by virtue of the fact that a metal cable, which is arranged and/or buried at the outer boundary 101 or a current-carrying conductor has been detected. However, the sensor element 16 can, for example, also be embodied as an infrared sensor by means of which the surface area 100 that is to be processed is recognized and consequently also its outer boundary 101 is recognized on the basis of the reflection from the ground. The precise position of the sensor element 16 is selected in FIG. 1 merely by way of example. Other arrangements can also be provided, for example at the front of the lawn mower 10, or else a plurality of sensor elements 16 can be provided.

The lawn mower 10 comprises in addition navigation and/or position-determining means 20 by means of which the lawn mower 10 can determine its position, in particular within the surface area 100 that is to be processed, with an accuracy between 10 cm and 2 m. Navigation and/or position-determining means 20 of this type can, for example, comprise sensors for detecting the wheel rotational speeds, inertial sensors and/or can comprise a GPS.

Figure 3:
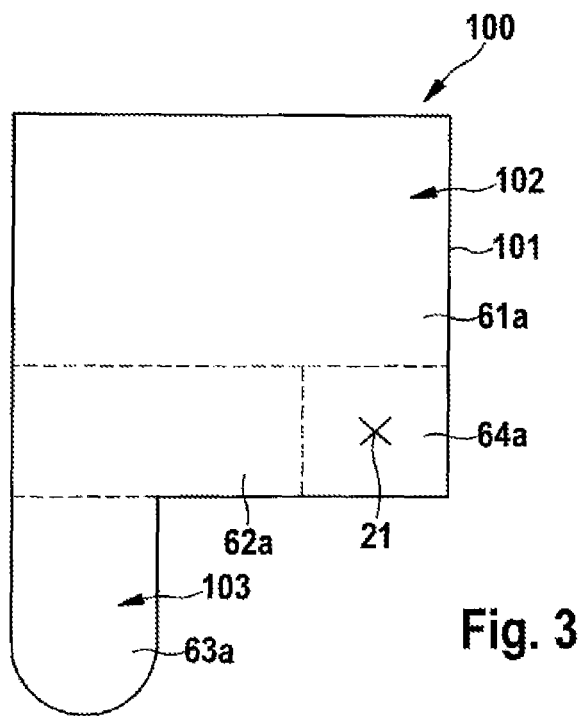
FIG. 3 and FIG. 4 show plan views in each case of an identically embodied surface area that is to be processed, each surface area having different individual segments
Figure 4:
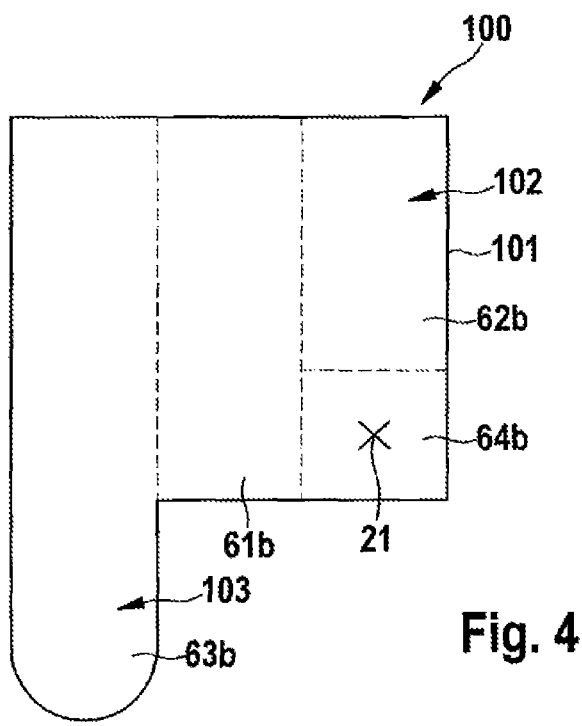

FIGS. 3 and 4 illustrate in each case by way of example the identical surface area 100 that is to be processed. In the region of the outer boundary 101 of the surface area 100, it is possible, as described, for example to provide a metallic line that is arranged in place by the lawn mower 10. The surface area 100 is essentially embodied from an approximately rectangular region 102 and a rectangular round-ended region 103 that lies adjacent to the long side of the rectangular region 102, wherein the surface area 100 that is to be processed can also comprise obstacles, for example trees.

Figure 2:
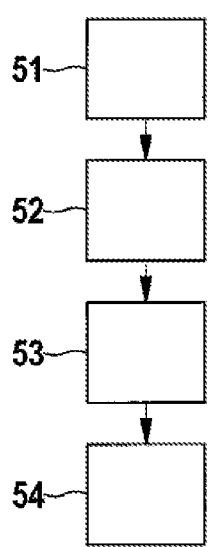
FIG. 2 shows a flow chart of a program for explaining the method in accordance with the disclosure for processing a surface area.

FIG. 2 illustrates, with its essential steps simplified, the program flow that is provided by the control unit 15 of the lawn mower 10 for processing the surface area 100. An outline map of the surface area 100 that is to be processed is produced by the control unit 15 in a first program step 51. The outline map of the surface area 100 that is to be processed is produced by virtue of the fact that the lawn mower 10 drives along the outer boundary 101 of the surface area 100 that is to be processed. The position of the lawn mower 100 is continuously determined by means of the navigation means 20. As soon as the lawn mower 10 has arrived back at its start position, which is recognized by means of the navigation means 20, the control unit 15 of the lawn mower 10 concludes that the surface area 100 that is to be processed has been completely encircled and/or determined.

In a second program step 51 that follows on from the first program step 51, the surface area 100 that is to be processed is subsequently divided by means of an algorithm into individual segments 61a to 64a and/or 61b to 64b. The surface area is divided into individual segments 61a to 64a and/or 61b to 64b by means of the control unit 15 randomly generating and/or dividing the surface area 100 that is to be processed into n segments. In the described exemplary embodiment in accordance with FIGS. 3 and 4, the surface area 100 that is to be processed is divided into four individual segments 61a to 64a and/or 61b to 64b. However, the number n of the segments can also be higher or lower. However, preferably a relatively small number n of segments is advantageous, so that the individual segments can comprise in each case relatively large surface areas that, as described hereinunder, render it possible at least in parts to process the surface area in a simpler and more rational manner. The number n of the segments can, for example, be provided to the control unit 15 in advance, by virtue of the fact that with the knowledge of the outline map of the surface area 100 and consequently also with the knowledge of its size, a value range for n is provided in advance, so that typically specified minimum variables are set for the segments. It is also possible initially to generate a multiplicity of segmentations with a different number n of the segments, wherein the segmentation that is generated with the larger individual surface areas is preferred.

Figure 5:
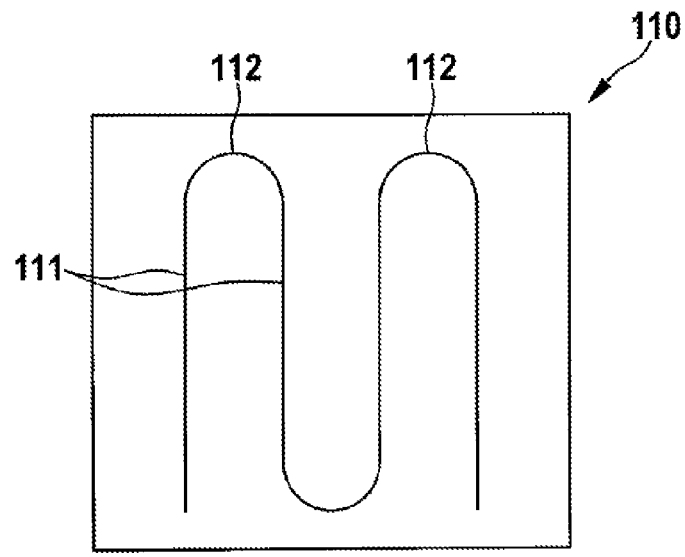
FIG. 5 and FIG. 6 show simplified plan views of different individual segments that are to be processed using different processing strategies.
Figure 6:
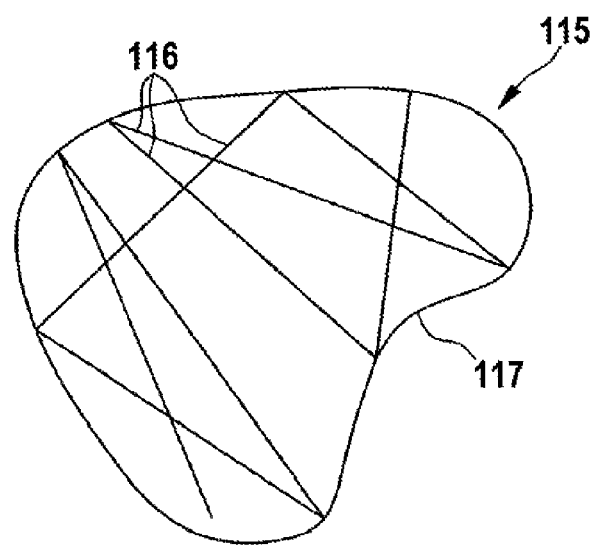

It is essential that a characteristic classification A or B is allocated to each individual segment 61a to 64a and/or 61b to 64b. The term 'characteristic classification A' is understood to mean an individual segment 61a to 64a and/or 61b to 64b that can be processed in a relatively simple manner. The term 'a surface that can be processed in a relatively simple manner' is understood in turn to mean a surface area the shape of which is in the form of a basic geometric shape, in particular a relatively rectangular and consequently convex shape. A surface area 110 of this type that is illustrated by way of example in FIG. 5 can be processed in particular by means of paths 111 that are arranged in parallel with each other and that are mutually connected by way of 180° turning maneuvers 112. In contrast thereto, the term 'characteristic classification B' is understood to mean a surface area that can be processed most effectively by means of a random strategy. Reference is made in relation thereto by way of example to FIG. 6 wherein the surface 115 is processed by virtue of the fact that the lawn mower 10 moves within the surface area 115 on paths 116 that are embodied in a straight line, wherein, as soon as the lawn mower 10 comes into contact with the outer boundary 117, the lawn mower 10 is rotated and/or turns about a random angle or a suitably heuristically determined angle.

FIGS. 3 and 4 illustrate in each case an identically embodied surface area 100 that is to be processed, said surfaces comprising in each case two individual segments 61a, 61b and 62a, 62b of the characteristic classification A and in each case two individual segments 63a, 63b and 64a, 64b of the characteristic classification B. Moreover, it is evident in the case of the individual segments 64a, 64b that there is an obstacle 21, for example a tree, located in the individual segment 64a, 64b. Although this tree or rather this obstacle 21 has not been recognized and/or detected by the lawn mower 10 as the outline map of the surface area 100 that is to be processed was being generated, its location is however known on the basis of a processing operation that has been performed previously and said obstacle is therefore also taken into consideration during the current strategy of processing the surface area 100.

Consequently, an incorrect classification of a segment 61a to 64a; 61b to 64b only occurs during a first processing of a surface area 100, but this incorrect classification is removed by taking into consideration the new knowledge and by re-applying the algorithm. In this respect, the described method can be used iteratively (real time) and delivers a suitable remaining strategy as the lawn mower passes over the surface area again. The same applies for the initially unknown exclusion zones that can be marked out by the boundary cable (for example flower beds, garden pool) and which are not recognized during the drive along the outer boundary 101.

The strategy for processing the surface area 100 is generated by virtue of the fact that the control unit 15 performs a summation of the characteristic classifications A and B of the individual segments 61a to 64a and/or 61b to 64b. The processing strategy that is pursued is the processing strategy that comprises a greater number of characteristic classifications A, said characteristic classifications rendering it possible for these segments to be processed in a simpler and/or more effective manner.

In the exemplified embodiment illustrated in FIGS. 3 and 4, the surface area 100 that is to be processed has been divided in each case into two individual segments 61a, 61b, 62a, 62b of the characteristic classification A and two individual segments 63a, 63b and 64a, 64b of the characteristic classification B. In this case, a processing strategy of the lawn mower 10 can be performed either by means of a segmentation in accordance with FIG. 3 or in accordance with FIG. 4, since the two segmentations comprise in each case two segments of the characteristic classification A. It can, however, also be provided that additional criteria are used to select the processing strategy. This additional criteria can, for example, comprise taking into consideration the size of the individual segments 61a to 64a and/or 61b to 64b that are to be processed, in particular taking into consideration the size of the segments that have the characteristic classification A and/or B. Thus, it is recognized, for example, with reference to FIG. 3, that the individual segment 61a of the characteristic classification A is somewhat greater than the individual segment 61b in accordance with FIG. 4. In addition, the individual segment 63a that belongs to the characteristic classification B is clearly smaller than the corresponding individual segment 63b in FIG. 4. In this respect, it appears more expedient to perform a processing strategy wherein the surface area 100 that is to be processed is segmented according to FIG. 3.

The above described process of classifying the individual segments 61a to 64a and/or 61b to 64b in the characteristics classification A, B is performed in the third program step 53. As shown in FIG. 2, the third program step 53 is followed by a fourth program step 54 in which the individual segments 61a to 64a and/or 61b to 64b are worked and/or processed one after the other according to the actual selected processing strategy. It can also be provided that the processing is performed in such a sequence that the smallest and shortest connecting paths are provided in each case between the individual segments 61a to 64a and/or 61b to 64b.

The method described thus far for processing a surface area 100 can be altered and/or modified in numerous ways without departing from the disclosure. In particular, the disclosure is also not limited to the use of a lawn mower 10.

The invention claimed is:

1. A method for processing a surface area by means of a robotic vehicle having (i) a control unit in which data relating to an outline of a surface area that is to be processed are stored, and (ii) a position-determining device configured to determine a position of the robotic vehicle in relation to the surface area that is to be processed, the method comprising:
   dividing the surface area that is to be processed into individual segments;
   classifying each individual segment in a characteristic classification defined by a planar shape of the individual segments; and
   driving over and processing each individual segment one after the other, wherein each individual segment is processed using a processing strategy corresponding to the characteristic classification of said individual segment.

2. The method as claimed in claim 1, further comprising:
driving the robotic vehicle along an outer boundary of the surface area that is to be processed to obtain the data relating to the surface area that is to be processed.

3. The method as claimed in claim 1, the dividing of the surface area that is to be processed into individual segments further comprising:
dividing the surface area that is to be processed into basic planar geometric shapes, each of which defines one of the individual segments.

4. The method as claimed in claim 3, wherein:
the basic planar geometric shapes are defined as at least one of generally rectangular shapes and convex geometric shapes.

5. The method as claimed in claim 4, wherein classifying each individual segment in a characteristic classification defined by a planar shape of the individual segments includes:
classifying each individual segment in a characteristic classification defined by basic planar geometric shapes.

6. A method for processing a surface area by means of a robotic vehicle having (i) a control unit in which data relating to an outline of a surface area that is to be processed are stored, and (ii) a position-determining device configured to determine a position of the robotic vehicle in relation to the surface area that is to be processed, the method comprising:
dividing the surface area that is to be processed into individual segments, each of the individual segments being basic planar shapes that are defined as at least one of generally rectangular shapes and convex geometric shapes;
classifying each individual segment in a characteristic classification defined by a basic planar shape of the individual segments; and
driving over and processing each individual segment one after the other, wherein each individual segment is processed using a processing strategy corresponding to the characteristic classification of said individual segment,
wherein dividing the surface area that is to be processed into individual segments includes:
initially randomly dividing the surface area that is to be processed into a multiplicity of temporary individual segments; and
generating a number, size and outline of the individual segments from the temporary individual segments such that at least one of a total number and a total surface area of individual segments classified in a first preferred characteristic classification is maximized and at least one of a respective total number and a respective total surface area of individual segments classified in a second preferred characteristic classification is minimized.

7. The method as claimed in claim 6, further comprising:
using results from previous processing operations or results obtained during a current processing operation to divide the surface area into individual segments.

8. The method as claimed in claim 1, wherein the processing strategy for processing the individual segments includes: (i) processing individual segments classified in a first characteristic classification by driving over a pre-defined movement path; and (ii) processing individual segments classified in a second characteristic classification by driving over at least one of a random movement path and a heuristically motivated movement path.

9. The method as claimed in claim 8, wherein:
the pre-defined movement path is defined by path portions that are in parallel with each other, and
the random movement path is defined by straight line path portions connected by turning maneuvers generated at boundaries of the individual segment by turning at a random angle.

10. The method as claimed in claim 1, wherein the robotic vehicle is an autonomously operating lawn mower.

11. A method for processing a surface area by means of a robotic vehicle having (i) a control unit in which data relating to an outline of a surface area that is to be processed are stored, and (ii) a position-determining device configured to determine a position of the robotic vehicle in relation to the surface area that is to be processed, the method comprising:
dividing the surface area that is to be processed into individual segments, each of the individual segments being basic planar shapes that are defined as at least one of generally rectangular shapes and convex geometric shapes;
classifying each individual segment in a characteristic classification defined by a basic planar shape of the individual segments; and
driving over and processing each individual segment one after the other, wherein each individual segment is processed using a processing strategy corresponding to the characteristic classification of said individual segment,
wherein dividing the surface area that is to be processed into individual segments includes:
initially randomly dividing the surface area that is to be processed into a multiplicity of temporary individual segments; and
generating a number, size and outline of the individual segments from the temporary individual segments such that at least one of a total number or surface area of individual segments classified in a preferred characteristic classification is maximized.

* * * * *